United States Patent
Lu et al.

(10) Patent No.: US 7,123,426 B2
(45) Date of Patent: *Oct. 17, 2006

(54) PROJECTION LENS AND DISPLAY DEVICE

(75) Inventors: Kai Chang Lu, Birmingham (GB); Ernesto M. Rodriguez, Jr., Austin, TX (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/090,370

(22) Filed: Mar. 25, 2005

(65) Prior Publication Data

US 2005/0237629 A1    Oct. 27, 2005

Related U.S. Application Data

(63) Continuation-in-part of application No. 11/003,252, filed on Dec. 3, 2004, and a continuation-in-part of application No. 11/003,243, filed on Dec. 3, 2004.

(60) Provisional application No. 60/556,612, filed on Mar. 26, 2004, provisional application No. 60/527,424, filed on Dec. 5, 2003.

(51) Int. Cl.
  *G02B 13/02* (2006.01)
  *G02B 15/14* (2006.01)
  *H04N 5/64* (2006.01)

(52) U.S. Cl. .................. 359/750; 359/680; 348/744

(58) Field of Classification Search ................ 359/750, 359/754–756, 680, 689, 708, 713; 348/744–745, 348/759, 794; 353/69–70
See application file for complete search history.

(56) References Cited

U.S. PATENT DOCUMENTS

| 4,070,098 A | 1/1978 | Buchroeder |
| 4,256,373 A | 3/1981 | Horimoto |
| 4,908,705 A | 3/1990 | Wight |
| 5,363,000 A | 11/1994 | Miyatake et al. |

(Continued)

FOREIGN PATENT DOCUMENTS

DE    29 20 360 A1    11/1980

(Continued)

OTHER PUBLICATIONS

Stupp, E.H. & Brennesholtz, M.S.; Projection Displays; John Wiley & Sons Ltd. (1999); pp. 146-150 and pp. 205-208.

*Primary Examiner*—Alicia M Harrington
(74) *Attorney, Agent, or Firm*—Gregg H. Rosenblatt (57) ABSTRACT

A wide angle projection lens include a first lens group of negative refractive power that has at least one aspheric surface. The wide angle projection lens can output an image at a half field angle of at least 45°, where the image has substantially no distortion and requires little or no keystone correction. The wide angle projection lens can be part of an optical engine that can be implemented in rear projection or front projection display devices.

28 Claims, 2 Drawing Sheets

U.S. PATENT DOCUMENTS

| | | |
|---|---|---|
| 5,442,484 A | 8/1995 | Shikawa |
| 5,510,862 A | 4/1996 | Lieberman et al. |
| 5,526,186 A | 6/1996 | Sekine |
| 5,606,459 A | 2/1997 | Nakatsuji |
| 5,625,495 A | 4/1997 | Moskovich |
| 5,664,859 A | 9/1997 | Salerno et al. |
| 5,870,228 A | 2/1999 | Kreitzer et al. |
| 5,900,987 A | 5/1999 | Kreitzer |
| 5,969,876 A | 10/1999 | Kreitzer et al. |
| 5,978,150 A | 11/1999 | Hamanishi et al. |
| 6,109,767 A | 8/2000 | Rodriguez |
| 6,137,638 A | 10/2000 | Yamagishi et al. |
| 6,179,426 B1 | 1/2001 | Rodriguez, Jr. et al. |
| 6,224,216 B1 | 5/2001 | Parker et al. |
| 6,439,726 B1 | 8/2002 | Piehler |
| 6,476,981 B1 | 11/2002 | Shikama |
| 6,542,316 B1 | 4/2003 | Yoneyama |
| 6,896,375 B1 * | 5/2005 | Peterson et al. ............... 353/77 |
| 2002/0057505 A1 | 5/2002 | Sato |
| 2002/0060859 A1 | 5/2002 | Yoneyama |

FOREIGN PATENT DOCUMENTS

| | | |
|---|---|---|
| JP | 62-201737 U | 12/1987 |
| JP | 02-027390 U | 2/1990 |
| JP | 02-196230 A | 8/1990 |
| JP | 02-230288 A | 9/1990 |
| JP | 03-027085 A | 2/1991 |
| JP | 03-056951 A | 3/1991 |
| JP | 07-151971 | 8/1995 |
| JP | 10-206969 A | 8/1998 |
| JP | 2004-245893 | 9/2004 |
| WO | WO 97/16927 | 5/1997 |
| WO | WO 00/67059 | 11/2000 |

* cited by examiner

PROJECTION LENS AND DISPLAY DEVICE

CROSS REFERENCE TO RELATED APPLICATIONS

This application is a continuation-in-part of U.S. patent application Ser. No. 11/003,243, filed Dec. 3, 2004, now pending, which claims priority to U.S. Provisional Patent Application No. 60/527424, filed Dec. 5, 2003. This application is also a continuation-in-part of U.S. patent application Ser. No. 11/003,252, filed Dec. 3, 2004, now pending, which claims priority to U.S. Provisional Patent Application No. 60/556612, filed Mar. 26, 2004. The disclosures of each of the aforementioned Applications are incorporated by reference herein in their entirety.

FIELD OF THE INVENTION

The present invention relates to a projection lens and display device for use in short throw distance applications. In particular, the projection lens can be utilized in both front projection and rear projection display systems, for e.g., multimedia and display applications for educational, commercial, and home uses. Moreover, the present invention relates to a projection device that provides a wide-angle projection lens that allows for extreme, off-axis image production and produces an image that is substantially distortion free and requires little to no keystone correction.

BACKGROUND

Electronic or video display systems are devices capable of presenting video or electronic generated images. Whether used in home entertainment, advertising, videoconferences or group conferences, the demand exists for an appropriate display device.

Image quality is one of the factors consumers use to determine the appropriate display device. In general, image quality can be determined qualitatively by factors such as image resolution and image color. As the desire by some consumers is for display devices having larger picture size, image quality can suffer. Typically, a large picture size is one that exceeds about 40 inch screen size as measured along the diagonal of the screen.

While many display devices are available on the market today, there is a continuing need to develop other devices.

SUMMARY

According to one embodiment, a wide-angle projection lens comprises (a) a first lens group of negative refractive power, the first lens group having at least one aspheric surface; (b) a second lens group of substantially zero refractive power; and (c) a third lens group of positive refractive power. The phrase "substantially zero refractive power" means less than 3% of the total lens power of all of the lens groups. The projection lens satisfies the following three conditions: Condition (1) is where the absolute value of the ratio of $F_1/F$ is less than 4.0 (i.e., $|F_1/F|<4.0$); Condition (2) is where the absolute value of the ratio of $F_2/F$ is greater than 50 (i.e., $|F_2/F|>50$); and Condition (3) is where the absolute value of the ratio of $F_3/F$ is less than 3.5 (i.e., $|F_3/F|<3.5$). In these conditions, F is the focal length of the wide-angle projection lens. $F_1$ is the focal length of the first lens group. $F_2$ is the focal length of the second lens group. $F_3$ is the focal length of the third lens group. The aperture stop of the projection lens can lie within or near the second lens group. In the preceding sentence, the term "near" means that the ratio of the distance of the aperture stop to the second surface of the last lens element in the second lens group to the distance of the projection lens track is about $\frac{1}{65}$. The third lens group is arranged so as to image the stop far from the lens, which means that the lens is approximately telecentric in image space. The wide-angle projection lens can be used in a rear projection display system. The wide-angle projection lens can also be used in a front projection display system.

In another embodiment, a display device includes an optical engine including an illumination system, an imaging system, and projection optics. The projection optics include a first lens group of negative refractive power that has at least one aspheric surface. The projection optics output an image at a half field angle of at least 45°, where the image has substantially no distortion. The output image can have a size of about 25 inches diagonal or greater. Also, in preferred aspects, the device does not require substantial keystone correction. In addition, the projection device projects an image having substantially no distortion. By substantially no distortion, it is meant that the distortion is no greater than 2%. In preferred aspects, the distortion is less than or equal to 1%, most preferably less than or equal to 0.5%. At these distortion values, for at least most imaging applications, no electronic distortion correction is required.

In another embodiment, a rear projection display device comprises an optical engine that includes: (a) an illumination system; (b) an imaging system; and (c) a projection lens having a back focal length of greater than about twice the effective focal length and a speed of less than or equal to about F/3.1 or less. The projection lens generates an image that has substantially no distortion and requires substantially no keystone correction. The rear projection display device further includes a cabinet, a screen supported by the cabinet to receive the image, and a base to house the optical engine.

In this document, the term "about" is presumed to modify all numerical values.

The above summary of the present invention is not intended to describe each illustrated embodiment or every implementation of the present invention. The figures and the detailed description that follows more particularly exemplify these embodiments.

These figures are not drawn to scale and are intended only for illustrative purposes. While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the invention as defined by the appended claims.

DETAILED DESCRIPTION

An exemplary embodiment of the present invention provides a projection lens and display device for use in short throw distance applications. In particular, the projection lens can be utilized in both front projection and rear projection display systems, for e.g., multimedia and display applications for educational, commercial, and home uses. Moreover, the present invention relates to a projection device that provides a wide-angle projection lens that allows for extreme, off-axis image production and produces an image that is substantially distortion free and requires little to no keystone correction.

Figure 1:
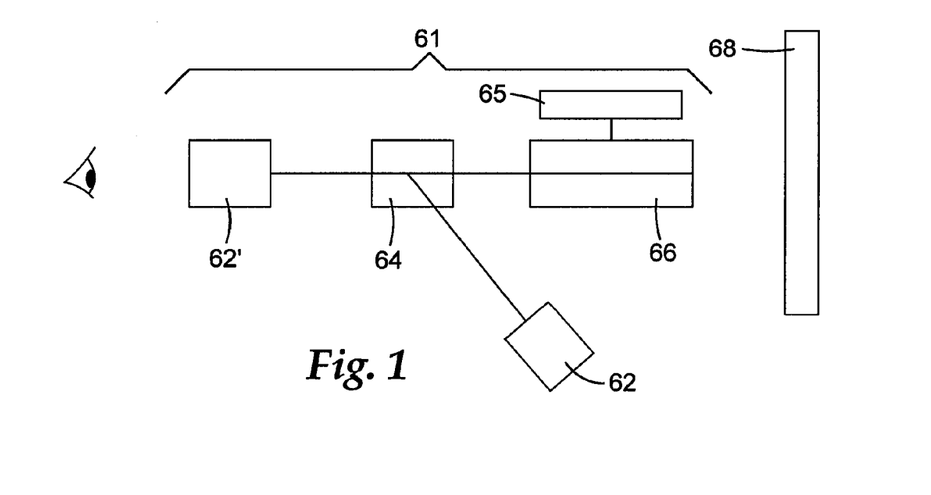
FIG. 1 is a schematic representation of an exemplary optical engine that can be used in the present invention.
Figure 3A:
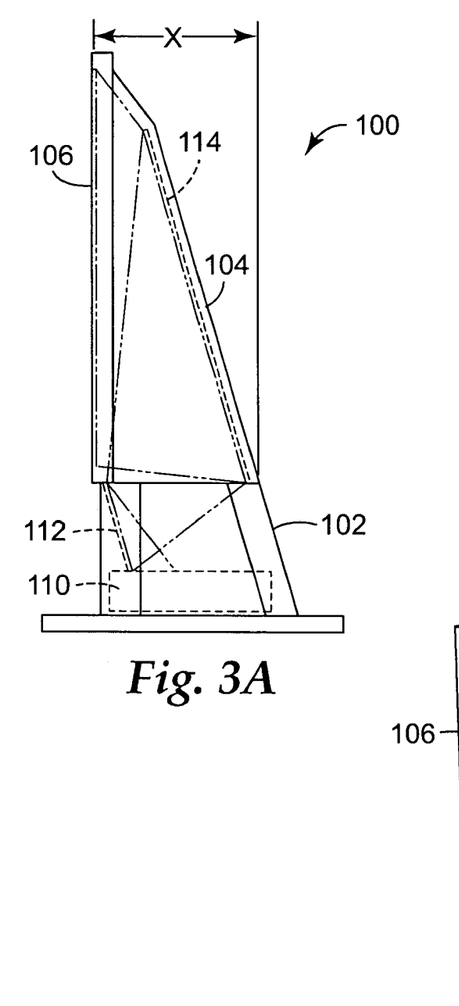
FIGS. 3A and 3B show a side view and an isometric view, respectively, of a rear projection display device according to an exemplary embodiment.
Figure 3B:
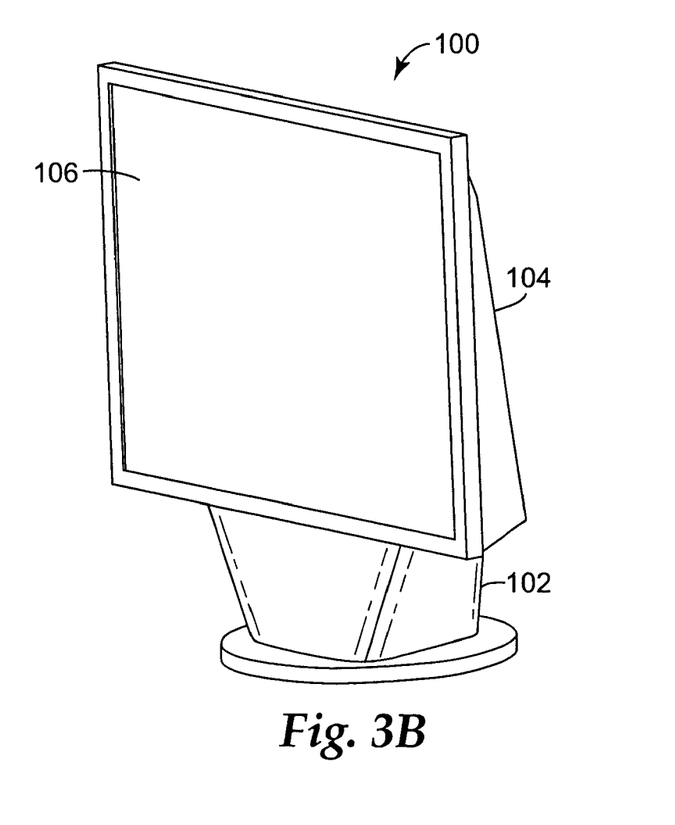

FIG. 1 shows a schematic representation of exemplary optical engine 61 having one or more of the following components: illumination system 62 or 62', imaging system 64, a focus mechanism 65, and projection optics 66. While two different illumination systems 62 and 62' are shown, typically only one is used. When the illumination system lies in position depicted by reference number 62, the imager used is a reflective imager. In contrast, when the illumination system lies in position depicted by reference number 62' the imager used is a transmissive imager. The optical engine can generate an image on a projection screen 68 or a viewing surface. Because the viewer and the optical engine are on the same side of the projection screen, FIG. 1 depicts a front projection display system using optical engine 61. FIGS. 3A and 3B depict a rear projection display system using optical engine 110. Each element in the optical engine is discussed in detail below.

The illumination system 62, 62' can include a lamp unit, a filter (such as an infrared light and/or a ultraviolet light rejection filter), a color separation means, and an integrator. In one exemplary embodiment, the lamp unit includes a reflector and a lamp. Suitable, commercially available lamps include (i) Philips UHP type lamp unit, which uses an elliptic reflector, from Philips Semiconductors, Eindhoven, The Netherlands and (ii) OSRAM P-VIP 250 lamp unit from OSRAM GmBH, Munich, Germany. Other suitable lamps and lamp unit arrangements can be used in the present invention. For example, metal halide lamps or tungsten halogen lamps or light emitting diodes (LED's) can be used. The type of filter, color wheel, and integrator that can be used in embodiments of the present invention are not critical. In one exemplary embodiment, the color separation means is a spinning red/green/blue (RGB) color sequential disc in the light source of the imager. An illustrative commercially available color wheel is the UNAXIS RGBW color wheel, from UNAXIS Balzers, LTD, Balzers, Liechtenstein. A liquid crystal RGB color sequential shutter can also be used in embodiments of the present invention. An illustrative commercially available integrator is a hollow tunnel type integrator from UNAXIS Balzers LTD.

The imaging system 64 can include an imager and typically can also include conventional electronics. A useful reflective imager that can be used in the present invention is a XGA digital micromirror device (DMD) having a diagonal dimension of about 22 mm, available from Texas Instruments, Dallas, Tex. Alternatively, a transmissive or reflective liquid crystal display (LCD) can be used as the imager. In exemplary optical engine embodiments, the surface of the imager is positioned substantially parallel to the surface of the projection screen.

For some implementations, a focusing mechanism 65 can be accomplished by mounting one or more of the lenses described below on a slidable or threaded mount (not shown), which can be adjusted manually by hand or through the use of an electronic actuation mechanism. For example, focusing can be accomplished by using a varifocal or a zoom lens. Alternatively, no user focus is required for projection units having a predetermined fixed position established between the optical engine 61 and the viewing screen 68 or for rear projection applications.

In some implementations, the screen 68 may comprise a multi-layer material, for example, a plurality of Fresnel elements configured as is described in U.S. Pat. No. 6,179,426. The screen can be designed to control light distribution spreading in the horizontal direction to accommodate viewers who are positioned horizontally in front of the screen. Alternative embodiments of the screen may comprise multilayer film technology, Dual Brightness Enhancement Film (DBEF) technology, or VIKUITI™0 technology, all available from 3M Company, Saint Paul, Minn. Optionally, the generated image can be viewed on any surface, e.g., a wall or other structure, or standard viewing screen.

Figure 2:
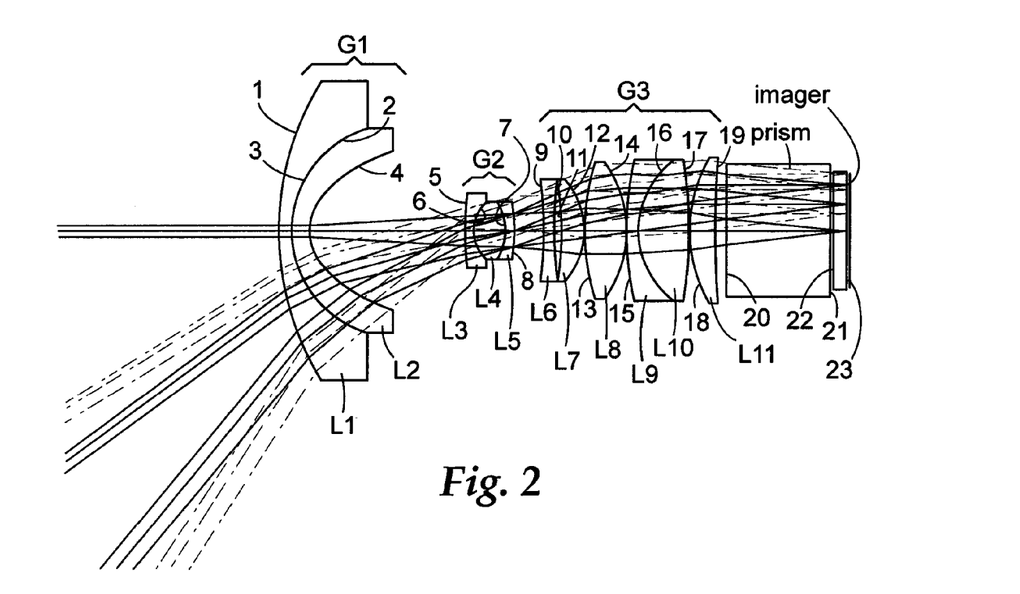
FIG. 2 is a schematic representation of an exemplary projection optics that can be used in the present invention.

FIG. 2 shows an exemplary embodiment of the projections optics (also referred to herein as a "projection lens" or a "wide-angle projection lens") of the optical engine 61. The projection optics of FIG. 2 include three lens groups (as identified from an output side or screen side): first lens group (G1), second lens group (G2), and third lens group (G3). The term "screen side" means that side of the projection lens closest to a projection screen. The three lens groups are discussed in detail below. As would be apparent to one of ordinary skill in the art given the present description herein, alternative constructions of projection lens 66 can be employed, including alternative constructions that include fewer, the same, or greater numbers of lens elements.

The exemplary projection lens of FIG. 2 includes a total of eleven (11) elements in the three lens groups, numbered from the screen side. The first lens group (G1) can include, in order from the screen side, a first lens element (L1) of negative refractive power and a second lens element (L2) having an aspheric surface on its second surface. Preferably, G1 is of negative refractive power. The ratio of $F_1/F$ in G1 can be such that $-3.5 < F_1/F < -2.3$. The second lens group (G2) can include three lens elements, (L3) to (L5) inclusive, affixed or cemented together using a conventional adhesive. Preferably, G2 is substantially zero refractive power. In another embodiment, G2 can be slightly positive in refractive power. In another embodiment, it can be slightly negative in refractive power. The ratio of $F_2/F$ in G2 can be such that $-95 < F_2/F < -86$. In this exemplary embodiment, the aperture stop lies within or near the second lens group G2. The third lens group (G3) can include six lens elements (L6) to (L11) inclusive. Preferably, G3 is of positive refractive power. The ratio of $F_3/F$ in G3 can be such that $2.5 < F_3/F < 3.2$. As shown in FIG. 2, a prism lies to the right of L11, i.e., furthest away from the projection screen in a front projection application. In the above description, F is the focal length of the wide-angle projection lens, $F_1$ is the focal length of the first lens group, $F_2$ is the focal length of the second lens group, and $F_3$ is the focal length of the third lens group.

In more detail, the first lens group G1 is preferably of negative refractive power. In a first embodiment, the first lens group G1 comprises a plurality of lens elements. For example, a first lens element (L1), lying closest to the screen, can have the largest diameter of all the lenses in the three lens groups. In one exemplary embodiment, the first lens element L1 in the first lens group has a sufficiently large diameter to project an image at a large field, i.e., at a half field angle greater than 45°, preferably greater than 50°, and most preferably about 55° in the direction of the screen, with substantially no distortion.

In another exemplary embodiment, the first lens element L1 in the first lens group has a diameter greater than 60 mm and less than 75 mm. In yet another exemplary embodiment, the first lens element of the first lens group has a diameter of about 70 mm. Thus, when implemented in a projection device, the first lens element can provide a field of view of about 110° to about 120°.

In the embodiment of FIG. 2, the first lens group G1 further includes a second lens element (L2) having at least one aspheric surface. The aspheric surface of the present exemplary embodiment can help reduce distortion effects, while still providing a large field of view. In one aspect, the second lens element can be fabricated from an optical polymer having a refractive index of about 1.49 and an Abbe number of about 57.2, such as polymethyl methacrylate (PMMA). The shape of the aspheric surface can be defined by the equation below:

$$Z = \frac{cr^2}{1 + \sqrt{1 - (1+k)c^2r^2}} + \alpha_2 r^2 + \alpha_4 r^4 + \alpha_6 r^4 + \alpha_8 r^8 + \alpha_{10} r^{10} \qquad \text{Equation I}$$

where Z is the surface sag at a distance r from the optical axis of the system c is the curvature of the lens at the optical axis in $$\frac{1}{mm}$$

r is the radial coordinate in mm k is the conic constant $\alpha_2$ is the coefficient for second order term, $\alpha_4$ is the coefficient for fourth order term, $\alpha_6$ is the coefficient for sixth order term, $\alpha_8$ is the coefficient for eighth order term, and $\alpha_{10}$ is the coefficient for tenth order term.

In another embodiment, the second surface of the first element of the first lens group has a radius of curvature substantially equal to the radius of curvature of the first surface of the second lens element in the first lens group.

In one embodiment, the first lens group G1 includes two meniscus shaped, nested lens elements, a first meniscus shaped element made of glass and a second meniscus shaped element made of plastic, with controlled thickness on the plastic element. A plastic such as PMMA can be used. The two elements are spaced apart such that the ratio of the distance between the second surface of the first element and the first surface of the second element to the overall effective focal length of the projection lens is 1/175.

In an exemplary embodiment, the second shaped element comprises an aspheric lens (e.g., a lens having at least one aspheric surface) having a substantially uniform thickness throughout. This dome-shaped design can reduce thermal problems and can provide for straightforward manufacturing.

In an alternative embodiment, the first lens group G1 can comprise two shaped elements molded together to form one integral element. For example, the first shaped element can comprise a glass element and the second shaped element can comprise a plastic (e.g., PMMA) element molded onto the second surface of the first shaped element.

In another alternative, the first lens group G1 can comprise a single element (e.g., a single glass element), with an aspheric surface formed on the first surface, second surface, or both surfaces of the single element.

In another exemplary embodiment, the second lens group G2 can be of substantially zero refractive power. The second lens group can be formed of a plurality of lens elements. The aperture stop of the projection lens 66 can lie within or near the second lens group. For example, in one embodiment, referring to FIG. 2, the aperture stop is provided at about L5.

In an exemplary embodiment, all lens elements in the second lens group can have spherical surfaces. In one exemplary embodiment, the second lens group G2 includes a cemented triplet to help control spherical aberration and coma. The on-axis spacing between the lens elements in G1 and the lens elements in G2 can be varied, if desired.

In an exemplary embodiment, the second lens group G2 provides a longer effective focal length. In addition, in an exemplary embodiment, the elements that make up the second lens group are formed from glass.

In an alternative embodiment, a doublet can be used for the second lens group G2. In this alternative embodiment, one or both of the doublet elements can include an aspheric surface.

In another exemplary embodiment, the third lens group G3 can be of positive refractive power and all lens elements in this lens group can have spherical surfaces. In an exemplary embodiment, the third lens group G3 provides color aberration correction (i.e., primary and secondary dispersion compensation). For example, lenses L7, L8, L10, and L11 can comprise the same glass material, e.g., MP 52. Alternatively, other glasses may also be utilized.

A prism (e.g., a TIR prism, not shown) can be disposed between the third lens group G3 and the imager 64, for example, at a location furthest away from the screen side. Alternatively, a field lens can be utilized.

By way of example, for the embodiment shown in FIG. 2, Table 1 below lists the surface number, in order from the output or screen side (with surface 1 being the surface closest to the screen side of the first lens element L1), the curvature (c) near the optical axis of each surface (in 1/millimeters), the on axis spacing (D) between the surfaces (in millimeters), and the glass type is also indicated. One skilled in the art will recognize that from the glass type, it is possible to determine the index of refraction and Abbe number of the material. Surface 0 is the object surface or the surface of the projection screen. In this embodiment, the wide-angle projection lens has an effective overall focal length of 8.8 mm, a half field angle of 55° in the direction of the output or screen side and operates at F/2.8. The first lens group G1 has an effective focal length of −25.4 mm; the second lens group G2 has an effective focal length of −800 mm; and the third lens group G3 has an effective focal length of 23.5 mm. The projection lens has a total track of 130 mm in this exemplary embodiment.

For the embodiment in FIG. 2, the second surface of the second lens element in the first lens group (denoted as surface 4 in Table 1) is aspheric, as governed by Equation I above, and has the following values for the coefficients: c=0.0901, k=−0.8938, $\alpha_2$=0, $\alpha_4$=1.99×10$^5$, $\alpha_6$=−7.468×10$^{-8}$, $\alpha_8$=3.523×10$^{-10}$, and $\alpha_{10}$=−5.970×10$^{-13}$. The wide-angle projection lens of the embodiment of FIG. 2 has a total track distance of 130 mm. As one skilled in the art will appreciate, in certain applications, such as front-projection and rear projection display applications, it can be advantageous to have a short total track distance because it would result in a compact projection lens thus minimizing the space requirements of the overall optical engine.

TABLE 1

| Surface No. | C (mm$^{-1}$) | D (mm) | Glass Type |
|---|---|---|---|
| 0 | 0 | 755 | |
| 1 | 0.0143 | 3.00 | SK16 |
| 2 | 0.0397 | 0.05 | |
| 3 | 0.0397 | 4.00 | Plastic |
| 4* | 0.0901 | 35.7 | |
| 5 | 0.0134 | 1.87 | N-LAF34 |
| 6 | 0.110 | 7.20 | F2 |
| 7 | −0.0796 | 2.00 | N-LAF34 |
| 8 | −0.0214 | 6.78 | |
| 9 | −0.0124 | 2.33 | N-LAK8 |
| 10 | 0.0117 | 1.49 | |
| 11 | −0.0148 | 5.35 | N-PK52 |
| 12 | −0.0553 | 0.187 | |
| 13 | 0.0178 | 9.48 | N-PK52 |
| 14 | −0.0365 | 0.187 | |
| 15 | 0.0110 | 2.40 | PBH6 |
| 16 | 0.0486 | 11.5 | N-PK52 |
| 17 | −0.00866 | 0.187 | |
| 18 | 0.0313 | 5.99 | N-PK52 |
| 19 | 0.00432 | 2.69 | |
| 20 | 0 | 23.4 | BK7 |
| 21 | 0 | 1.00 | |
| 22 | 0 | 3.00 | FK5 |
| 23 | 0 | 0.480 | |
| 24 | 0 | 0 | |

Tables 2 and 3 below list the general lens data and the surface data summary for the embodiment of FIG. 2.

TABLE 2

GENERAL LENS DATA:

| | |
|---|---|
| Surfaces | 24 |
| Stop | 8 |
| System Aperture | Image Space F/# - 3 |
| Glass Catalogs | schott_2000 OLD_SCHO OHARA CORNING OLD_OHAR MISC |
| Ray Aiming | Real Reference, Cache On |
| X Pupil Shift | 0 |
| Y Pupil Shift | 0 |
| Z Pupil Shift | 0 |
| Apodization | Uniform, Factor = 1.00000E+000 |
| Effective Focal Length | 8.806583 (in air) |
| Effective Focal Length | 8.806583 (in image space) |
| Back Focal Length | 0.4613371 |
| Total Track | 130.237 |
| Image Space F/# | 3 |
| Paraxial Working F# | 3.000816 |
| Working F/# | 2.995898 |
| Image Space NA | 0.1643555 |
| Object Space NA | 0.001891026 |
| Stop Radius | 4.013512 |
| Paraxial Image Height | 13.4 |
| Paraxial Magnification | −0.01134926 |
| Entrance Pupil Diameter | 2.935528 |
| Entrance Pupil Position | 21.1718 |
| Exit Pupil Diameter | 122.5057 |
| Exit Pupil Position | −367.5356 |
| Field Type | Paraxial Image height in millimeters |
| Maximum Field | 13.4 |
| Primary Wave | 0.55 |
| Lens Units | Millimeters |
| Angular Magnification | 0.02396238 |

TABLE 3

SURFACE DATA SUMMARY:

| Surf | Type | Comment | Radius | Thickness | Glass | Diameter | Conic |
|---|---|---|---|---|---|---|---|
| OBJ | STANDARD | | Infinity | 755 | | 2361.387 | 0 |
| 1 | STANDARD | 148-2A | 69.7004 | 3 | SK16 | 70 | 0 |
| 2 | STANDARD | | 25.176 | 0.05 | | 47.55672 | 0 |
| 3 | STANDARD | 20A | 25.176 | 4 | 1.491000, 57.200000 | 48 | 0 |
| 4 | EVENASPH | | 11.09472 | 35.68789 | | 38 | −0.8938386 |
| 5 | STANDARD | 449-1B | 74.447 | 1.866667 | N-LAF34 | 17 | 0 |
| 6 | STANDARD | NEW | 9.0968 | 7.2 | F2 | 13.5 | 0 |
| 7 | STANDARD | 46-1 | −12.5675 | 2 | N-LAF34 | 13.5 | 0 |
| STO | STANDARD | 565-1B | −46.676 | 6.775973 | | 13.5 | 0 |
| 9 | STANDARD | 169-3A | −80.8308 | 2.333333 | N-LAK8 | 24 | 0 |
| 10 | STANDARD | NEW | 85.79379 | 1.491645 | | 21.2 | 0 |
| 11 | STANDARD | 650-1A | −67.755 | 5.352434 | N-PK52 | 21.2 | 0 |
| 12 | STANDARD | 588-1B | −18.0787 | 0.1866667 | | 24 | 0 |
| 13 | STANDARD | 116-2A | 56.217 | 9.481976 | N-PK52 | 32 | 0 |
| 14 | STANDARD | 700-1B | −27.3991 | 0.1866667 | | 32 | 0 |
| 15 | STANDARD | 665-1B | 91.167 | 2.4 | PBH6 | 33 | 0 |
| 16 | STANDARD | 11A | 20.5695 | 11.47223 | N-PK52 | 33 | 0 |
| 17 | STANDARD | 463-1B | −115.465 | 0.1866667 | | 33 | 0 |
| 18 | STANDARD | 35B | 32 | 5.992456 | N-PK52 | 34 | 0 |
| 19 | STANDARD | 331-1A | 231.217 | 2.692432 | | 34 | 0 |
| 20 | STANDARD | | Infinity | 23.4 | BK7 | 30.90276 | 0 |
| 21 | STANDARD | | Infinity | 1 | | 27.53016 | 0 |
| 22 | STANDARD | | Infinity | 3 | FK5 | 27.31099 | 0 |
| 23 | STANDARD | | Infinity | 0.48 | | 26.87009 | 0 |
| IMA | STANDARD | | Infinity | | | 26.76488 | 0 |

The data provided in the Tables above represent one example and are not intended to limit the scope of the invention described herein.

The optical engine described above can be utilized in a variety of projection applications. For example, several front projection applications are described in related patent application Ser. No. 11/003,252, incorporated by reference in its entirety above.

In an exemplary rear projection application, FIGS. 3A and 3B show a side view and an isometric view, respectively, of a rear projection display device 100. In an exemplary embodiment, display device 100 includes an optical engine 110, similar to optical engine 61 described above, and including a wide angle projection lens, similar to projection optics 66 described above.

Rear projection display device 100 includes a base 102, a cabinet 104, and a screen 106. As shown in FIGS. 3A and 3B, the rear projection display device can be implemented as a rear projection television. Other implementations can include commercial and educational display devices that can present a large (e.g., 40 inch diagonal or greater) image to one or more viewers.

The base 102 can house components such as optical engine 110, as well as a power supply, control electronics, audio components, and a connector panel (not shown for simplicity), one or more of which can be coupled to the optical engine 110. The base 102 can also be configured to provide structural support for display device 100. In addition, depending on the design of the optical engine 110, the base can further include a reflecting surface, such as mirror 112, which can direct the image projected from the optical engine 110 to screen 106 and/or an additional reflecting surface or surfaces, such as reflecting surface or mirror 114, which is housed in cabinet 104. The reflective surfaces (or mirrors) 112, 114 used in the rear projection display device 100 can be configured as, e.g., first surface mirrors, a reflective fresnel surface (or surfaces), or another high reflective material. As would be apparent to one of ordinary skill in the art given the present description, one or more reflecting surfaces can be utilized with the optical engine described herein to provide a projected image to screen 106.

Cabinet 104 can be configured to house one or more reflecting surfaces, such as mentioned above. Further, cabinet 104 can support viewing screen 106, which can be configured to provide one or more different image formats, such as a 4×3 format, or a 16×9 format.

Screen 106, which receives the projected image (see e.g., the example phantom lines shown in FIG. 3A), can vary in size and shape, based on the projected image size and format. Regarding screen construction, for example, the screen 106 may comprise a multi-layer material, for example, a plurality of Fresnel elements configured as is described in U.S. Pat. No. 6,179,426. The screen can be designed to control light distribution spreading in the horizontal direction to accommodate viewers who are positioned horizontally in front of the screen. Alternative embodiments of the screen may comprise multi-layer film technology, Dual Brightness Enhancement Film (DBEF) technology, or VIKUITI™ technology, all available from 3M Company, Saint Paul, Minn.

As mentioned above, optical engine 110 can be constructed in a manner similar to optical engine 61 described above with respect to FIG. 1, and can include a wideangle projection lens, similar to projection optics 66 described above. In addition, optical engine 110 can include an illumination system and an imaging system similar to that described above, and can be structurally configured to accommodate different base and cabinet designs.

For example, optical engine 110 can have a V-shape type layout, a U-shape type layout, or an L-shape type layout, depending on the type of imager or illumination system utilized. As wide angle/short throw type optical engine 110 can provide an image at a large field, i.e., at a half field angle greater than 45°, preferably greater than 50°, and most preferably about 55°, the depth (x) of cabinet 104 can be reduced from that of conventional rear projection display devices. For example, the depth (x) of cabinet 104 can be from about 5 inches to about 15 inches, preferably from about 7 inches to about 12 inches, and more preferably from about 7 inches to about 10 inches. As would be understood given the present description, the depth (x) of cabinet 104 can vary based on factors such as screen diagonal size and image format.

In an exemplary embodiment, optical engine 110 can include an imager or imaging device utilizing, e.g., DLP, LCD, or LCOS technology. In one exemplary embodiment, the optical engine can provide an image having a 4×3 format. In another exemplary embodiment, the optical engine can be implemented with a suitable imager to provide a different screen format, such as a 16×9 format. In further exemplary embodiments, the illumination system can be constructed from, for example, a lamp unit (such as an arc lamp or other types of lamps), in a manner similar to that described above. Alternatively, the illumination system of optical engine 110 can utilize a solid-state system, such as a laser-based or LED-based system.

Alternatively, the optical engine can be implemented with correction circuitry (e.g., a conventional warp chip), which can result in sufficient image quality at even shorter throw distances.

In addition, the optical engine is designed so that little or no keystone correction is necessary, while distortion is reduced. For example, distortion values for the projected image can be less than or equal to 2%, preferably less than or equal to 1.0%, and more preferably less than or equal to 0.5% (e.g., where distortion (d) can be determined by: $d=(H-h)/h*100$, where h is the paraxial image height and H is actual image height).

With this exemplary optical engine, a lower-cost, thin cabinet, rear projection display device design can be achieved as less complex TIR parts can be utilized. Larger size (e.g., greater than 40 inches (diagonal)) images can be obtained from short distances and at extreme off-axis positions, while keeping the display cabinet relatively thin. In addition, the optical engine described herein is substantially distortion free and requires little to no keystone correction.

In an alternative embodiment, a rear projection display device can be designed for a wall-mounted or ceiling-hung implementation, where the base section is implemented to house the optical engine and other electronics, and is not required to support the device as a stand.

Those skilled in the art will appreciate that the present invention may be used with a variety of different optical components. While the present invention has been described with a reference to exemplary preferred embodiments, the invention may be embodied in other specific forms without departing from the scope of the invention. Accordingly, it should be understood that the embodiments described and illustrated herein are only exemplary and should not be considered as limiting the scope of the present invention. Other variations and modifications may be made in accordance with the scope of the present invention.

What is claimed is:

1. A wide-angle projection lens comprising:
   (a) a first lens group of negative refractive power, the first lens group having at least one aspheric surface;
   (b) a second lens group of substantially zero refractive power and wherein an aperture stop lies within or near the second lens group; and
   (c) a third lens group of positive refractive power;
   wherein the following Conditions (1) to (3) are satisfied:

$|F_1/F|<4.0$  Condition (1)

$|F_2/F|>50$  Condition (2)

$|F_3/F|<3.5$  Condition (3)

where
   F is the focal length of the wide-angle projection lens;
   $F_1$ is the focal length of the first lens group;
   $F_2$ is the focal length of the second lens group; and
   $F_3$ is the focal length of the third lens group, wherein the first lens group comprises a first and a second lens element, the second lens element including the aspheric surface at its second surface.

2. The wide-angle projection lens of claim 1, wherein the lens is incorporated in a rear projection display system.

3. The wide-angle projection lens of claim 1, wherein the F/# is less than or equal to about F/2.8.

4. The wide-angle projection lens of claim 1, wherein Condition (1) is $-3.5<F_1/F<-2.3$, wherein Condition (2) is $-95<F_2/F<-86$, and wherein Condition (3) is $2.5<F_3/F<3.2$.

5. The wide-angle projection lens of claim 1 having a speed of less than or equal to about F/3.0 and an effective focal length of about 9 mm.

6. The wide-angle projection lens of claim 1, wherein the first lens group comprises a first meniscus shaped lens element nested with a second meniscus shaped lens element.

7. An optical engine for a display device, comprising:
   an illumination system, an imaging system, and a wide angle projection lens, wherein the wide angle projection lens includes at least a first lens group of negative refractive power and having at least one aspheric surface, wherein the wide angle projection lens outputs an image at a half field angle of at least about 45°, wherein the image has substantially no distortion, and a second lens group that includes a plurality of lens elements and is disposed adjacent the first lens group, wherein the second lens group has substantially zero refractive power, and wherein a ratio of a focal length of the second lens group to a focal length of the wide angle projection lens $(F_2/F)$ has the relationship: $-95<F_2/F<-86$.

8. The optical engine of claim 7, wherein the wide angle projection lens outputs an image at a half field angle of at least about 50°.

9. The optical engine of claim 8, wherein the wide angle projection lens outputs an image at a half field angle of at least about 55°.

10. The optical engine of claim 7, wherein a projected image size is at least 25 inches (diagonal measurement) and requires substantially no keystone correction.

11. The optical engine of claim 7, wherein a projected image format is one of a 4×3 format and a 16×9 format.

12. The optical engine of claim 7, wherein the optical engine is incorporated in a rear projection display system.

13. The optical engine of claim 7, wherein the first lens group comprises a first lens element of negative refractive power and a second lens element having an aspheric surface on a second surface thereof, wherein a ratio of a focal length of the first lens group to a focal length of the projection optics $(F_1/F)$ has the relationship: $-3.5<F_1/F<-2.3$.

14. The optical engine of claim 7, wherein the aperture stop of the wide angle projection lens is located at about the second lens group.

15. The optical engine of claim 7, further comprising a third lens group having a positive refractive power and including a plurality of lens elements disposed adjacent the second lens group, wherein a ratio of a focal length of the third lens group to a focal length of the wide angle projection lens $(F_3/F)$ has the relationship: $2.5<F_3/F<3.2$.

16. The optical engine of claim 7, wherein the first lens group comprises a single element having an aspheric surface formed on at least one of a first and second surface of the single element.

17. The optical engine of claim 7,
   wherein an aperture stop lies within or near the second lens group,
   further comprising a third lens group of positive refractive power;
   wherein the following Conditions (1) and (3) are satisfied:

$|F_1/F|<4.0$  Condition (1)

$|F_3/F|<3.5$  Condition (3)

where
   F is the focal length of the projection optics;
   $F_1$ is the focal length of the first lens group; and
   $F_3$ is the focal length of the third lens group.

18. The optical engine of claim 17, wherein the first lens group comprises a first lens element of negative refractive power and a second lens element of substantially uniform thickness throughout.

19. The optical engine of claim 7 further comprising:
   image correction circuitry.

20. A rear projection display device, comprising:
   an optical engine that includes:
      (a) an illumination system;
      (b) an imaging system; and
      (c) a projection lens having a back focal length of greater than about twice the effective focal length and a speed of less than or equal to about F/3.1 or less, and wherein the projection lens generates an image that has substantially no distortion and requires substantially no keystone correction, wherein the first lens group comprises a first and second lens element, the second surface of the first element having a radius of curvature substantially equal to that of the first surface of the second lens element;
   a cabinet;
   a screen supported by the cabinet to receive the image; and
   a base to house the optical engine.

21. The rear projection display device of claim 20, wherein the base supports the cabinet and screen.

22. The rear projection display device of claim 20, wherein the cabinet has a depth of about 7 to about 10 inches.

23. The rear projection display device of claim 20, wherein at least one of the base and the cabinet further comprises a reflecting surface to direct the image to the screen.

24. A wide-angle projection lens comprising:
   (a) a first lens group of negative refractive power, the first lens group having at least one aspheric surface;

(b) a second lens group of substantially zero refractive power and wherein an aperture stop lies within or near the second lens group; and (c) a third lens group of positive refractive power;

wherein the following Conditions (1) to (3) are satisfied:

$|F_1/F|<4.0$      Condition (1)

$|F_2/F|>50$      Condition (2)

$|F_3/F|<3.5$      Condition (3)

where

F is the focal length of the wide-angle projection lens;
$F_1$ is the focal length of the first lens group;
$F_2$ is the focal length of the second lens group; and
$F_3$ is the focal length of the third lens group, wherein the first lens group comprises a first and second lens element, the second surface of the first element having a radius of curvature substantially equal to that of the first surface of the second lens element.

25. The wide-angle projection lens of claim 24, wherein the lens is incorporated in a rear projection display system.

26. The wide-angle projection lens of claim 24, wherein the F/# is less than or equal to about F/2.8.

27. The wide-angle projection lens of claim 24 having a speed of less than or equal to about F/3.0 and an effective focal length of about 9 mm.

28. The wide-angle projection lens of claim 24, wherein the first lens group comprises a first meniscus shaped lens element nested with a second meniscus shaped lens element.

* * * * *

UNITED STATES PATENT AND TRADEMARK OFFICE
CERTIFICATE OF CORRECTION

PATENT NO.        : 7,123,426 B2
APPLICATION NO.   : 11/090370
DATED             : October 17, 2006
INVENTOR(S)       : Kai Chang Lu It is certified that error appears in the above-identified patent and that said Letters Patent is hereby corrected as shown below:

Title Page,
Item [56], References Cited, under U.S. Patent Documents, delete "5,363,000".
Item [56], References Cited, under U.S. Patent Documents, please add the following references:

-- 5,363,242    11/08/1994    Miyatake et al.
   5,390,048    02/14/1995    Shikawa --

Column 3,
Line 16, delete "a ultraviolet" and insert -- an ultraviolet -- therefor.

Column 4,
Line 16, delete "VIKUITI$^{TM}$0" and insert -- VIKUITI$^{TM}$ -- therefor.

Column 5,
Line 25, delete " $Z = \dfrac{cr^2}{1+\sqrt{1-(1+k)c^2r^2}} + \alpha_2 r^2 + \alpha_4 r^4 + \alpha_6 r^4 + \alpha_8 r^8 + \alpha_{10} r^{10}$ " and insert -- $Z = \dfrac{cr^2}{1+\sqrt{1-(1+k)c^2r^2}} + \alpha_2 r^2 + \alpha_4 r^4 + \alpha_6 r^6 + \alpha_8 r^8 + \alpha_{10} r^{10}$ -- therefor.

Column 6,
Line 62, delete "$\alpha_4 = 1.99 \times 10^5$," and insert -- $\alpha_4 = 1.99 \times 10^{-5}$, -- therefor.

Column 9,
Line 64, delete "wideangle" and insert -- wide-angle -- therefor.

Column 11,
Line 14, delete "|F$_3$/F|<3.5" and insert -- |F$_3$/F|<3.5 -- therefor.

Column 12,
Line 35, after "claim 7" insert -- . --.

UNITED STATES PATENT AND TRADEMARK OFFICE
CERTIFICATE OF CORRECTION

PATENT NO. : 7,123,426 B2
APPLICATION NO. : 11/090370
DATED : October 17, 2006
INVENTOR(S) : Kai Chang Lu It is certified that error appears in the above-identified patent and that said Letters Patent is hereby corrected as shown below:

Column 14,
Line 7, delete "F/#is" and insert -- F/# is -- therefor.

Signed and Sealed this

Second Day of January, 2007

JON W. DUDAS
*Director of the United States Patent and Trademark Office*